PAUL J. BURCHETT
INVENTOR.

BY George J. Smyth
ATTORNEY

Patented Sept. 28, 1948

2,450,113

UNITED STATES PATENT OFFICE 2,450,113

SPEED CONTROL DEVICE FOR MOTOR VEHICLES

Paul J. Burchett, Glendale, Calif.

Application May 9, 1945, Serial No. 592,903

11 Claims. (Cl. 180—82.1)

1

This invention relates to speed control devices, and more particularly to a device for regulating the fuel supplied to a motor of a vehicle to control the speed of said vehicle.

The present invention in the broadest aspects thereof comprises means for regulating the fuel delivered to any power plant or motor of a vehicle to maintain the speed thereof constant regardless of the position of the vehicle. The device of the present invention is particularly adapted for use in connection with the internal combustion engines of present day motor vehicles and the embodiment of the invention selected to illustrate the same is shown in connection with such an engine.

Present day motor vehicles are supplied with an accelerator or foot-operated throttle as well as a hand-operated throttle for varying the amount of fuel or gas supplied to the motor. The constant thrust which must be exerted by the foot against the accelerator tires an operator or driver when the vehicle is driven any great length of time. Some operators attempt to relieve the strain and fatigue caused by the use of the accelerator by using the hand throttle, where the same is not spring loaded, to control the amount of fuel furnished the engine.

Although this obviates the necessity of holding the foot against the spring loaded accelerator, it is not satisfactory except where the road is extremely level. Where the vehicle is being driven over a road which ascends and descends the vehicle will lose speed when the vehicle is ascending a grade and increase its speed as it descends a grade.

This practice is also dangerous as the time consumed by the driver in reaching out and pushing the hand throttle to its normal position lengthens the period of time in which the vehicle can be brought to a stop. The decelerating time is increased even if the brakes are applied without returning the hand throttle to its normal position or if the clutch is disengaged during the deceleration.

The device of the present invention not only relieves the driver of constantly urging his foot against the accelerator but varies the amount of fuel supplied to the engine in accordance with the position of the vehicle to the end that the vehicle can be operated at some preselected speed even though the vehicle is driven over a road which is not level. This is accomplished by the device of the present invention without increasing the hazards of operating the vehicle for it is so constructed that it automatically decreases

2 the flow of fuel to the engine if the brakes are applied and the vehicle decelerated.

The illustrated embodiment of the device of the present invention comprises a pendulum which is slidably mounted relative to the carburetor of the engine and connected through linkage mechanism to the ordinary control lever of the carburetor. The position of the pendulum can be slidably adjusted through some means convenient to the operator of the vehicle such as the conventional hand throttle. This adjustment of the pendulum operates the control lever of the carburetor through the interconnecting linkage mechanism and varies the quantity of fuel supplied to the engine as in conventional installations. Thus by slidably moving the pendulum through suitable manipulation of the hand throttle the carburetor can be caused to deliver any desired quantity of fuel to the engine.

As the relative position of the pendulum and carburetor will vary in response to changes in the departure of the vehicle from the horizontal, the relative movement of the pendulum is transmitted through the linkage mechanism to the control lever to effect a control of the fuel supplied to the engine in accordance with the position of the vehicle. Thus, if the pendulum has been adjusted so that the control lever is moved by the interconnecting linkage to a position in which the carburetor supplies sufficient fuel to the engine to cause the same to drive the vehicle over a level road at 40 miles per hour, for example, the movement of the pendulum as the vehicle ascends a grade is transmitted through the linkage mechanism to the control lever to move the same and increases the fuel supplied to the engine to the end that the preselected speed of 40 miles per hour is approximately maintained even though the vehicle is ascending a grade. The converse is true for the reverse movement of the pendulum as the vehicle descends a grade is transmitted to the control lever and the fuel supplied to the engine is decreased in accordance with the grade of the slope down which the vehicle is driven.

As the pendulum is also actuated by changes in the momentum of the vehicle, deceleration of the same will cause the pendulum to swing relative to the vehicle and this movement, transmitted by the linkage mechanism to the control lever of the carburetor, closes the valve of the carburetor and stops the flow of fuel to the engine.

As it may be necessary, due to transient traffic conditions, to drive the vehicle at a speed in excess of the preselected one, means are provided in the device of the present invention to permit the operator of the vehicle to use the accelerator to increase the fuel supplied to the engine without disturbing the pendulum control of the carburetor. Thus, the operator may depress the accelerator to increase the speed of the vehicle and yet when he removes his foot from the same the vehicle will be driven at the preselected speed without again resetting the device.

To prevent the pendulum from being affected by jolts or other transient changes in position and momentum, the pendulum is mounted in a flask or the like at least partially filled with a liquid of relatively high viscosity. The liquid damps movement of the pendulum and prevents fluctuation of the same due to local road conditions.

Other features and advantages of the present invention will be apparent from the following description taken in connection with the attached drawing in which.

Figure 1:
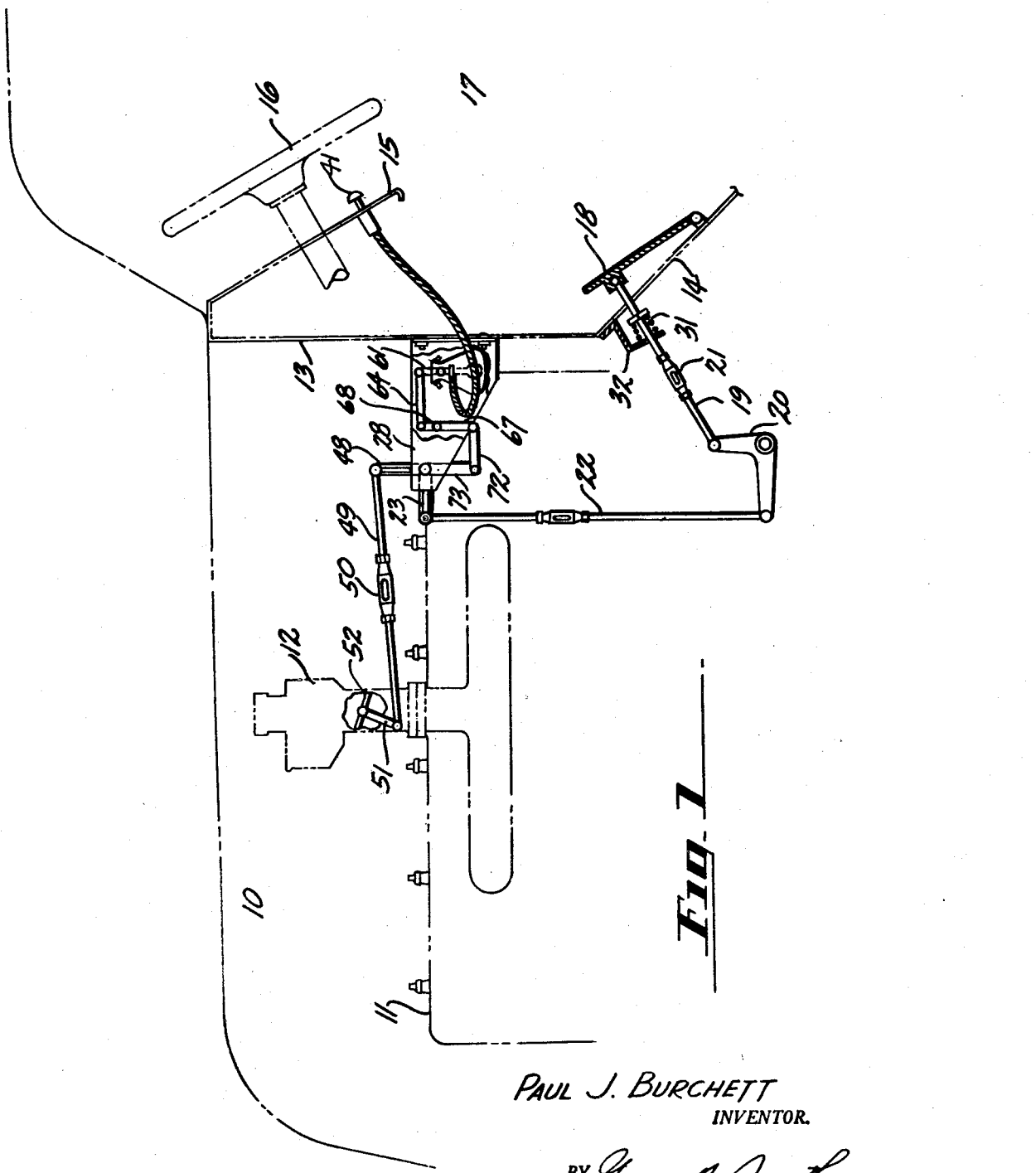
Figure 1 is a side elevation of the device of the present invention installed on a motor vehicle.

The illustrated embodiment of the device of the present invention, referring now to Figure 1 of the drawing, is shown applied to a motor vehicle generally indicated by the reference numeral 10. The showing of the vehicle includes a motor 11, a carburetor 12, fire wall 13, floor boards 14, instrument panel 15 and a steering wheel 16 in the driver's compartment generally indicated by the reference numeral 17.

A foot-operated throttle or accelerator 18 is shown mounted to the floor boards 14 and a link 19 having one end secured to the accelerator is mounted for reciprocal movement in an opening in the floor boards. The other end of the link is pivotally connected to one arm of a bell crank 20 which is mounted by some suitable pivot means to the vehicle 10. A turnbuckle 21 connected into the link 19 provides a longitudinal adjustment of the link to facilitate mounting of the bell crank.

An elongated rigid link 22 is pivotally connected at its opposite ends respectively to the other arm of the bell crank 20 and a finger 23 formed integral with a band 24 sleeving a tubular shaft 25. The opposite ends of the shaft 25 are rotatably mounted in opposing side walls 26 and 27 of a casing 28. Although the casing can be mounted to any portion of the vehicle desired, it is shown as mounted to the motor side of the fire wall 13 by some conventional means.

Figure 2:
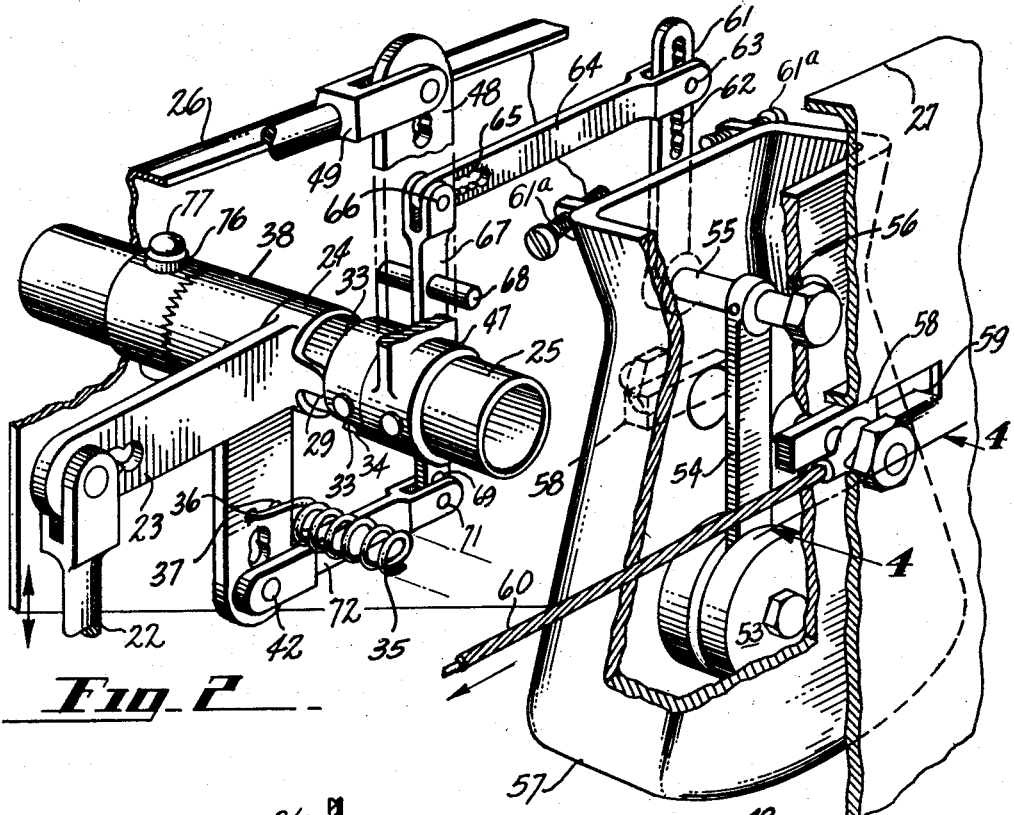
Figure 2 is an enlarged perspective view of the pendulum and a part of the linkage mechanism interconnecting the same and the control lever of the carburetor as well as the foot accelerator of the vehicle.
Figure 3:
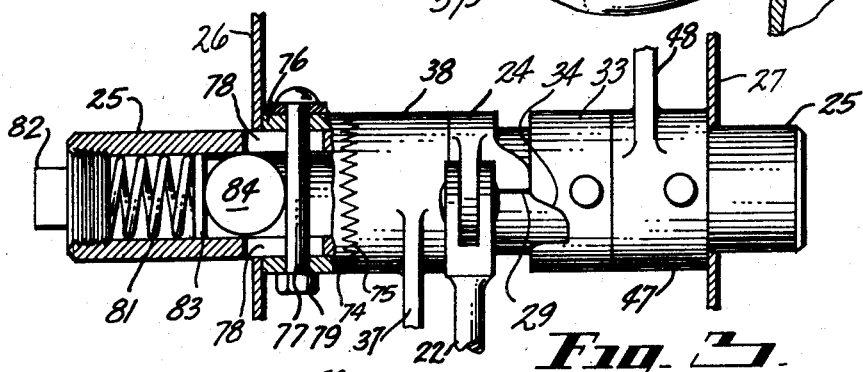
Figure 3 is an elevation partly in section of the connection between the accelerator and the linkage mechanism.

The band 24, as best shown in Figures 2 and 3, is formed with a lug or tooth 29 laterally projecting from the one edge thereof. As the accelerator 18 is normally held in the position shown in Figure 1 by the spring 31 carried by the bracket 32, the finger 23 is held in the position shown in Figure 2 with the lug 29 engaging the edge face of a sleeve 33 pinned to the shaft 25. The sleeve 33 is formed with a notch 34 for receiving the lug 29 upon rotation of the band 24 downwardly as viewed in Figure 2. The notch is of such a shape relative to the shape of the lug 29 that the sleeve 33 and the shaft 25 will rotate with band 24 after the lug has been received in the notch.

It will be seen, referring again to Figure 1, that pressure against the accelerator 18 will thrust the link 19 against the bell crank 20 to rock the same in a counter-clockwise direction and draw the link 22 downwardly. This downward movement of the link 22 causes the finger 23 to swing in a counter-clockwise direction which, referring back to Figure 2, rotates the band to bring the lug 29 into alignment with the notch 34. As the band 24 is slidably mounted on the shaft 25, it is free to move to the right as viewed in Figures 2 and 3 when the lug is aligned with the notch to cause the lug to engage with the notch and couple the band 24 and sleeve 33 together for simultaneous rotation. Although any means desired may be used to move the band 24 into coupling engagement with the notched sleeve 33, in the now preferred embodiment of the invention, referring now to Figure 2, this is done by a spring 35 having one end fixed in a pair of spaced openings 36 in an arm 37 formed integral with a sleeve 38 also rotatably as well as slidably mounted on the shaft 25. The opposite end of the spring 35 is secured in any manner desired to the wall 27 of the casing 28 and normally urges the sleeve 38 to the right, as viewed in Figures 2 and 3.

It will now be seen that the spring 35 normally tends to move the sleeve 38 and the band 24 to the right as viewed in Figures 2 and 3 and will cause the band to slide in that direction axially of the shaft when the lug 29 is moved into alignment with the notch 33. Engagement of the lug 29 in the notch couples the sleeve 33 to the band 24 for rotation therewith as the foot acceleration is depressed.

After the lug is engaged in the notch, further depression of the accelerator 18 will now cause the band 24 to rotate the shaft 25 through the sleeve 33 pinned thereto. As the collar 47 to which the lever arm 48 is fixed is also keyed or pinned to the shaft, the rotation of the latter in a counter-clockwise direction causes the lever arm 48 to swing in a counter-clockwise direction. An elongate link 49 comprising a pair of short links interconnected by a turnbuckle 50 is pivotally connected at one end to the lever arm 48 and at the opposite end to the control lever 51 of the butterfly valve 52 of the carburetor. Counter-clockwise rotation of the lever 48 actuates the elongate link 49 to cause the control lever to open the valve 52 of the carburetor and increase the fuel delivered to the motor.

Thus, in the device of the present invention the operator uses the foot accelerator of the vehicle in the conventional manner. The accelerator is returned to its normal inoperative position by the spring 31 and the return movement of the accelerator causes the band 24 to rotate in a clockwise direction resulting in a disengagement of the lug 29 from the notch 34.

Figure 4:
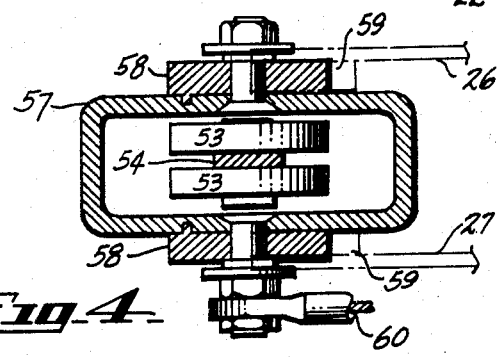
Figure 4 is a section taken along line 4—4 of Figure 2.

The automatic control of the valve 52 is effected through a means responsive to changes in the position and momentum of the vehicle. This means comprises in the illustrated embodiment of the invention a pendulum 53, the shaft 54 of which is rigidly fixed to a stub shaft 55. The opposite ends of the shaft 55 are journalled in suitable bearings 56 carried by the opposite walls of a flask 57. The flask is slidably mounted within the casing 28 through slides 58 fixed to the flask and mounted as best shown in Figure 4 in slots 59 formed in the walls 26 and 27 of the casing. The cable 60 of the usual hand throttle is connected to the flask so that the position of the same relative to the casing 28 can be adjustable by the operator of the vehicle.

An arm 61 rigidly secured to the one end of the shaft 55 and normally held vertical by the pendulum 53 is formed with a slot 62 the opposite walls of which are provided with spaced, inwardly projecting teeth forming a plurality of communicating openings for adjustably receiving a pivot pin 63 carried by the bifurcated end of a link 64. The one wall of the flask 57 carries a pair of lugs in each of which is threaded a screw 61a forming adjustable stops for limiting the pivotal movement of the arm 61. The opposite end of the link 64 is formed with a slot 65 similar to the slot 62, adapted to adjustably receive a pivot pin 66 carried by the bifurcated end of a rock arm 67. The arm 67 is mounted for rocking movement about the axis of the shaft 68 supported by the walls 26 and 27 of the casing 28.

The lower end of the rock arm 67 is formed with a slot 69 which receives a pivot pin 71 carried by one end of a short link 72. The opposite end of the link 72 is pivotally connected by an adjustable connection 74 to the outer end of the arm 37 carried by the sleeve 38.

It will now be seen that should the pendulum swing about the axis of the shaft 55 the latter will rotate or rock and swing the arm 61 in one direction or the other, depending upon the direction of movement of the pendulum 53. For example, if the pendulum should swing in a clockwise direction the arm 61 will move in the same direction and draw the link 64 to the right, as viewed in Figure 2, which will cause the rock arm 67 to move in a clockwise direction and urge the link 72 to the left, as viewed in Figure 2. This movement of the link 72 will cause the arm 37 and sleeve 38 to also move in a clockwise direction.

The one edge face of the sleeve 38 is formed with a plurality of teeth 74 which are adapted to engage and mesh with similarly shaped teeth 75 formed about the contiguous edge face of a collar 76. The collar 76 is pinned to the shaft 25 through a bolt 77 passed through diametrically opposed apertures formed in the collar 76. The shaft 25 is provided with a pair of slots 78 to receive the bolt 77 which is held against movement radially of the collar 76 by a nut 79.

The collar 76 is urged inwardly of the casing by a spring 81 mounted within the shaft 25 with one end of the same seating on a plug 82 threaded into the end of the shaft. The opposite end of the spring acts against a washer 83 engaging a ball 84 to urge the same against the bolt 77 to hold the teeth 75 of the collar 76 in good meshing engagement with the teeth 74 of the sleeve 38. As the sleeve 38 is coupled to the collar 76 through the meshing teeth 74 and 75 the rotation of the sleeve 38 in a clockwise direction will be transmitted to the collar, and this rotational movement of the collar 76, as the same is pinned to the shaft 25, will cause the shaft 25 to rotate in a clockwise direction and swing the lever arm 48 in the same direction to draw the link 49 to the right, as viewed in Figure 2. As the link 49 is connected to the control lever 51 of the butterfly valve 52, this movement of the link 49 will cause the butterfly valve to close, thereby shutting off or decreasing the supply of fuel to the engine of the vehicle.

As the pendulum is activated by gravity as well as momentum, it will be seen that changes in the momentum as well as the position of the vehicle relative to the horiozntal will cause movement of the pendulum and its associated lever and link mechanisms to either close or open the butterfly valve, depending upon the direction of swing of the pendulum.

In the intended use of the present invention, the operator by grasping the knob 41 of the conventional hand throttle and pulling the same outwardly of the instrument panel 15 can, through the cable 60, adjust the position of the flask relative to the casing 28. The movement of the flask is transmitted through the linkage mechanism heretofore described to the control lever 51 and results in an adjustment of the position of the butterfly valve 52 of the carburetor. Thus, if the operator desires to have the motor drive the vehicle at a rate of forty miles per hour, for example, he can, by adjustment of the knob 41 and cable 60, move the flask forwardly in the casing 28 to open the butterfly valve to the position in which fuel is supplied to the engine in a quantity sufficient to cause the motor or engine to drive the vehicle at the speed of forty miles an hour.

The vehicle will thereafter be driven at an approximate speed of forty miles an hour even though the vehicle is being operated over a road having grades of different percentages for the pendulum will swing forwardly of the casing to activate the lever and linkage mechanisms in a direction to close the valve when the vehicle is descending a grade, and swing rearwardly of the casing when the vehicle is ascending a grade, and activate the linkage and lever mechanisms in a direction to open the valve of the carburetor.

As the pendulum is also responsive to changes in the momentum of the vehicle, the deceleration of the vehicle by an application of the brakes thereof will cause the pendulum to swing forwardly and decrease or cut off the supply of fuel to the motor. As long as the vehicle is decelerating, the pendulum will remain in its forward position in which the control lever of the carburetor is held in its valve closing position, but will return to its normal position at the close of the deleceration period.

If it is necessary due to transient traffic conditions to drive the vehicle at a speed in excess of the preselected one, the accelerator 18 may be used to increase the supply of fuel delivered to the motor, as heretofore explained. The use of the foot accelerator does not cancel the control of the pendulum, for when the operator removes his foot from the accelerator the pendulum will again control the speed of the vehicle which will be driven at the preselected speed.

The use of the accelerator does not affect the pendulum for although the spring 81 will cause the collar 76 to move to the right as viewed in Figure 2, as the band 24 moves in the same direction under the urging of the spring 35 when the lug enters the notch 34, the inner end walls of the slots 78 limit this movement of the collar. This movement of the collar is arrested before the lug is completely engaged in the notch so that continued movement of the sleeve 38 brings about a disengagement of the teeth 74 and 75. Thus, the sleeve 38 is not coupled to the collar 76 after the lug 29 is completely received in the notch 34 and as the sleeve is free to rotate relative to the shaft 25, rotation of the latter brought about by operation of the accelerator will not actuate or move the pendulum.

To prevent the pendulum from being affected by jolts or other transient changes in position and momentum, the flask is preferably filled, or partially filled, with a liquid, not shown, having a relatively high viscosity. The liquid will damp movement of the pendulum and prevent fluctuation of the same due to local road conditions.

It will be seen that the present invention provides a mechanism easily mounted or attached to a vehicle, and which will relieve the driver of the necessity of constantly urging his foot against the accelerator. Furthermore, the device will also adjust or vary the amount of fuel supplied to the engine in accordance with the position of the vehicle relative to the horizontal, to the end that the vehicle can be operated at some preselected approximate speed even though the vehicle is being operated over a road which is not level. This is accomplished by the device of the present invention without increasing the hazards of operating the vehicle, for as pointed out hereinabove, the device will automatically decrease the flow of fuel to the engine as the brakes are applied and the vehicle decelerated.

Although the now preferred embodiment of the invention has been shown and described herein, it is to be understood that the invention need not be limited thereto, for it is susceptible to changes in form and detail within the scope of the appended claims.

I claim:

1. A speed regulating device for a motor vehicle having a means for controlling a supply of fuel to the motor thereof comprising means activated by gravity and momentum; means interconnecting said activated means and the fuel controlling means of the motor of the vehicle whereby a control of the fuel supplied to the motor is effected in accordance with changes in the position and momentum of the vehicle; and manually operable means for activating the fuel controlling means for increasing the fuel delivered to said motor, said last-named means when operated disconnecting said interconnecting means and thereby overriding the control of said fuel controlling means by said activated means.

2. A speed regulating device for a motor vehicle having a means for controlling a supply of fuel to the motor thereof comprising means activated by gravity and momentum; means for slidably mounting said activated means on said vehicle; means under the control of the operator of said vehicle for slidably adjusting the position of said activated means relative to the fuel controlling means; means interconnecting said activated means and the fuel delivering means of the motor of the vehicle whereby a control of the fuel supplied to the motor is effected in accordance with changes in the position and momentum of the vehicle; and manually operable means separate from said operator controlled means for operating said fuel controlling means to selectively increase the fuel delivered to said motor, said last-named means when operated disconnecting said interconnecting means and thereby overriding the control of said fuel controlling means by said activated means.

3. A speed regulating device for a motor vehicle having a means for controlling a supply of fuel to the motor thereof comprising a flask to be slidably mounted on said vehicle; a pendulum mounted within said flask; a liquid having a relatively high viscosity substantially filling said flask and dampening movement of said pendulum; means under the control of the operator of said vehicle for slidably adjusting the position of said flask relative to said fuel controlling means; and means connected to said pendulum for transmitting movement of said flask to the fuel controlling means of the motor to vary the amount of fuel delivered to said motor in accordance with the position of said flask, said means also transmitting movement of said pendulum whereby the amount of fuel delivered to said motor is also varied in accordance with changes in the position and momentum of said vehicle.

4. A speed control device for a motor vehicle having a foot-operated accelerator and a throttle valve in the carburetor thereof for varying the fuel supplied to the motor of said vehicle comprising a shaft; means for rotatably mounting the shaft on said vehicle; means made operative by actuation of said accelerator for rotating the shaft when said accelerator is actuated; means movably mounted on said vehicle and activated by gravity and momentum; means interconnecting said last-named means and said shaft whereby the latter is rotated in accordance with changes in the position and momentum of said vehicle; means for operating the valve upon rotation of said shaft; and means for rendering said interconnecting means inoperative to rotate said shaft during operation of said first-named shaft-rotating means.

5. A speed control device for a motor vehicle having a foot operated accelerator and a throttle valve in the carburetor thereof for varying the fuel supplied to the motor of said vehicle comprising a pendulum; means for mounting said pendulum on said vehicle; a shaft rotatably mounted on said vehicle; means interconnecting said pendulum and said shaft adapted to rotate the latter upon movement of said pendulum; means interconnecting said accelerator and said shaft including means normally inoperative and rendered operative upon predetermined actuation of said accelerator for rotating said shaft; and means for actuating said throttle valve in accordance with rotation of said shaft.

6. A speed control device for a motor vehicle having a foot-operated accelerator and a throttle valve in the carburetor thereof for varying the fuel supplied to the motor of said vehicle comprising means for controlling said throttle valve; normally inoperative means rendered operative by actuation of said accelerator for operating said controlling means to effect a control of said throttle valve in response to a predetermined operation of said accelerator; and means for operating said controlling means to effect a control of said throttle valve in response to changes in the position and momentum of said vehicle, said last-named operating means being rendered inoperative by operation of the means operated by actuation of said accelerator.

7. A speed control device for a motor vehicle having a foot-operated accelerator and a throttle valve in the carburetor thereof for varying the fuel supplied to the motor of said vehicle comprising means for controlling said throttle valve; normally inoperative means rendered operative by a predetermined operation of said accelerator for operating said controlling means to effect a control of said throttle valve in accordance with operation of said accelerator; a pendulum; means normally operative for operating said controlling means to effect a control of said throttle valve in response to movement of said pendulum produced by changes in the position and momentum of said vehicle; means for rendering said last-named operating means inoperative upon the predetermined operation of the accelerator; and means for varying the effect of movement of said pendulum whereby the control of said throttle valve by said pendulum can be adjusted.

8. A speed control device for a motor vehicle having a foot-operated accelerator and a throttle valve in the carburetor thereof for varying the fuel supplied to the motor of said vehicle comprising means for controlling said throttle valve; normally inoperative means rendered operative by actuation of said accelerator for operating said controlling means to effect a control of said throttle valve in response to a predetermined operation of said accelerator; means including a pendulum for operating said controlling means to effect a control of said throttle valve in response to movement of said pendulum produced by changes in the position and momentum of said vehicle; and means for rendering said last-named operating means inoperative when said means operated by actuation of said accelerator is operating said controlling means.

9. A speed control device for a motor vehicle having a foot-operated accelerator and a throttle valve in the carburetor thereof for varying the fuel supplied to the motor of said vehicle comprising means for controlling said throttle valve; normally inoperative means for operating said controlling means to effect a control of said throttle valve; means interconnecting said accelerator and said operating means, said operating means rendered operative in response to a predetermined operation of said accelerator; a pendulum; means normally operative for operating said controlling means; means interconnecting said pendulum and said normally operative means whereby the latter operates said controlling means in response to changes in the position and momentum of said vehicle sufficient to activate said pendulum; and means for rendering said pendulum-controlled means inoperative upon operation of the means operated by actuation of said accelerator.

10. A speed control device for a motor vehicle having a foot-operated accelerator and a throttle valve in the carburetor thereof for varying the fuel supplied to the motor of said vehicle comprising means for controlling said throttle valve; normally inoperative means for operating said controlling means to effect a control of said throttle valve; means interconnecting said accelerator and said operating means, said operating means rendered operative in response to a predetermined operation of said accelerator; a pendulum; means normally operative for operating said controlling means; means interconnecting said pendulum and said normally operative means whereby the latter operates said controlling means in response to changes in the position and momentum of said vehicle sufficient to activate said pendulum; means for rendering said pendulum-controlled means inoperative upon operation of the means operated by actuation of said accelerator; and means for adjusting the position of said pendulum to cause operation of said normally operative means to effect a control of said throttle valve and to adjust the effect of movement of said pendulum on said operating means in response to changes in the position and momentum of said vehicle.

11. A speed control device for a motor vehicle having a foot-operated accelerator and a throttle valve in the carburetor thereof for varying the fuel supplied to the motor of said vehicle comprising a shaft; means for rotatably mounting said shaft on said vehicle; a pair of clutch mechanisms mounted on said shaft, one of said clutch mechanisms being normally inoperative, the other of said clutch mechanisms being normally operative; means for rendering said normally inoperative clutch mechanism operative upon depression of said accelerator whereby said shaft is rotated in accordance with the amount of depression of said accelerator; means for rendering the normally operative clutch mechanism inoperative upon operation of the other clutch mechanism; a pendulum; means interconnecting said pendulum and said normally operative clutch mechanism whereby said shaft is rotated in accordance with movement of said pendulum in response to changes in the position and momentum of said vehicle; and means for operating said throttle valve in accordance with direction and magnitude of rotation of said shaft.

PAUL J. BURCHETT.

REFERENCES CITED

The following references are of record in the file of this patent:

UNITED STATES PATENTS

| Number | Name | Date |
|---|---|---|
| 903,133 | Enrico | Nov. 3, 1908 |
| 1,186,588 | Lemon | June 13, 1916 |
| 1,559,181 | Reynolds | Oct. 27, 1925 |
| 1,623,921 | Howell | Apr. 5, 1927 |
| 2,060,536 | Smith | Nov. 10, 1936 |
| 2,074,724 | Gallup | Mar. 23, 1937 |
| 2,245,512 | Weaver | June 10, 1941 |
| 2,302,322 | Howard | Nov. 17, 1942 |